US009791259B2

United States Patent
Cheng et al.

(10) Patent No.: US 9,791,259 B2
(45) Date of Patent: Oct. 17, 2017

(54) INTERFEROMETRIC DISTANCE SENSING DEVICE AND METHOD WITH LESS DEPENDENCY ON ENVIRONMENT DISTURBANCES ON A FIBER

(71) Applicant: Nederlandse Organisatie voor toegepast-natuurwetenschappelijk onderzoek TNO, 's-Gravenhage (NL)

(72) Inventors: Lun Kai Cheng, 's-Gravenhage (NL); Ronald Antonius Jan Hagen, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/785,367

(22) PCT Filed: Apr. 17, 2014

(86) PCT No.: PCT/NL2014/050241
§ 371 (c)(1),
(2) Date: Oct. 19, 2015

(87) PCT Pub. No.: WO2014/171825
PCT Pub. Date: Oct. 23, 2014

(65) Prior Publication Data
US 2016/0076872 A1  Mar. 17, 2016

(30) Foreign Application Priority Data
Apr. 17, 2013 (EP) .................................... 13164178

(51) Int. Cl.
*G01B 9/02* (2006.01)

(52) U.S. Cl.
CPC ....... *G01B 9/0209* (2013.01); *G01B 9/02014* (2013.01); *G01B 9/02057* (2013.01);
(Continued)

(58) Field of Classification Search
CPC ............ G01B 9/02057; G01B 9/02064; G01B 9/02014; G01B 9/02027; G01B 9/02028;
(Continued)

(56) References Cited

U.S. PATENT DOCUMENTS 4,641,971 A * 2/1987 Korth ................. G01B 11/0633
348/135
2003/0223075 A1* 12/2003 Ishizuka ................ G01D 5/344
356/491

(Continued)

FOREIGN PATENT DOCUMENTS

DE 10 2005 061 464 A1 7/2007
KR 20120080670 A 7/2012

(Continued)

OTHER PUBLICATIONS

Fitzsimons et al, "Initial interferometric pre-investigations for LISA," 7th International LISA Symposium, Journal of Physics: Conference Series 154, pp. 1-6, 2009.

(Continued)

*Primary Examiner* — Michael P Lapage
(74) *Attorney, Agent, or Firm* — Hoffmann & Baron, LLP

(57) ABSTRACT

Distance to a target is sensed using a common path interferometer, wherein a first fraction of light from a light source is collected after reflection by a partially reflective element together with reflection from a target of a second fraction of light from the light source that has been transmitted by the partially reflective element. The collected light is split in two parts, both containing a part of the first fraction and part of the reflection from the target. The parts are fed through a first and second optical branch path to an input side of a three-way optical coupler respectively. Light from at three terminals on a second side of the N way coupler is fed to respective light intensity detectors. Information representing an excess distance traveled by the first fraction from detec- (Continued)

tion signals determined by the least three light intensity detectors.

13 Claims, 2 Drawing Sheets

(52) U.S. Cl.
CPC ..... *G01B 9/02064* (2013.01); *G01B 9/02065* (2013.01); *G01B 9/02081* (2013.01); *G01B 2290/45* (2013.01)

(58) Field of Classification Search
CPC .............. G01B 9/0209; G01B 9/02081; G01B 9/02065; G01B 2290/45
See application file for complete search history.

(56) References Cited

U.S. PATENT DOCUMENTS

| | | |
|---|---|---|
| 2004/0239943 A1 | 12/2004 | Izatt et al. |
| 2005/0046864 A1* | 3/2005 | Millerd ................ G01B 11/303 356/495 |
| 2005/0275846 A1 | 12/2005 | Cheng |
| 2008/0030740 A1* | 2/2008 | Wang .................... A61B 5/0059 356/477 |
| 2009/0210971 A1* | 8/2009 | Nakata ................... B82Y 35/00 850/1 |
| 2011/0176200 A1 | 7/2011 | Chen |
| 2011/0299090 A1 | 12/2011 | Ueki |
| 2012/0044457 A1* | 2/2012 | Sato ........................ A61B 3/102 351/206 |

FOREIGN PATENT DOCUMENTS

| | | |
|---|---|---|
| WO | 2006080923 A1 | 8/2006 |
| WO | 2013000866 A1 | 1/2013 |

OTHER PUBLICATIONS

Wu, "Periodic nonlinearity resulting from ghost reflections in heterodyne interferometry," Optics Communications 215, pp. 17-23, 2003.

\* cited by examiner

INTERFEROMETRIC DISTANCE SENSING DEVICE AND METHOD WITH LESS DEPENDENCY ON ENVIRONMENT DISTURBANCES ON A FIBER

CROSS-REFERENCE TO RELATED APPLICATIONS

This application is the U.S. National Phase of, and Applicants claim priority from, International Patent Application Number PCT/NL2014/050241 filed Apr. 17, 2014, which claims priority from EP 13164178.9 filed Apr. 17, 2013, each of which is incorporated herein by reference.

FIELD OF THE INVENTION

The invention relates to an interferometric distance sensing device and to a method of interferometrically sensing distance.

BACKGROUND OF THE INVENTION

WO2013000866 discloses an interferometric distance sensing device with a common path architecture. As is well known, an interferometric distance sensing device detects interference between a reference beam and a sensing beam that has been reflected from a target. In common path architecture, the reference beam travels through a large part of the path of the sensing beam towards the target and back. Typically, the device contains a reference mirror close to the sensor head that reflects the reference beam, but passes the sensing beam back and forth to the target. Thus, the sensing beam and the reference beam share a common path up to the reference mirror and back, and the part of the path of the sensing beam between the mirror and the target is the only difference between the reference and sensing paths. Compared to a conventional interferometer with separate sensing and reference paths, this eliminates effects of differences in temperature or mechanical variation of the common paths.

WO2013000866 modifies the common path architecture by the introduction of two parallel beam paths in the common path, so that both the reference beam and the sensing beam at the mirror are composed of a sum of parts that have traveled through the respective parallel beam paths (as used herein, "parallel" refers to the fact that respective parts of the light travels through both paths (parallelism of function) and not to parallel in a geometric sense). One of the parallel beam paths is longer than the other. This introduces the dependence on coherence length of the light source. Interference can only occur and be detected if the difference between the length of the light path of the sensing beam and the reference beam is not much more than the coherence length. In the conventional common path architecture this limits the distance from the mirror to the target to about the coherence length. With the parallel beam paths, this distance increased by half the difference between the parallel beam paths.

For the parallel beam path, as a result of the detected interference is due to a part of the reference beam that has traveled through the longer of the parallel beam paths and a part of the sensing beam that has traveled through the shorter of the parallel beam paths. Hence, part of the advantage of the common path architecture is lost, but the advantages still apply for the fiber to the sensing head, which is most exposed to environmental disturbances. WO2013000866 considers various positions for the location of the parallel beam paths: it can be located in the path between the light source and the mirror. When the path between the light source and the mirror contains an circulator that directs returning light to a detector, the parallel beam paths can be located in the path between the light source and the mirror before or after the circulator, or in the path from the circulator to the detector. In the latter case, the light to the target does not travel through the parallel paths.

Outside the field of common path architectures, sub-wavelength accurate path length difference measurement is possible when different paths can be coupled to different inputs of a three way coupler, as described for example in US2005275846.

As noted, common path architecture eliminates effects of differences in temperature or mechanical variation of the paths. Nevertheless, variation of the common path may still affect sensing results in conventional interferometer. Basically, the interference intensity as a function of distance to the target is the sum of a constant term and a periodic term, the phase position in this period depending on a ratio between the distance and the wavelength. By counting the number of periods, wavelength accuracy is possible. The distance could be determined with sub-wavelength accuracy from the intensity obtained the common path architecture and hence the phase measurement, when the amplitudes of the constant term and the periodic term would be known. However, variation of the common path affects these amplitudes, and hence the determination of the distance. This effect can be addressed by sensing at different wavelengths, but this complicates sensing.

WO2006/080923 discloses a simultaneous phase shifting Fizeau interferometer. It discusses the problems of encoding reference and test beams, so that they can be spatially separated at the back end. WO2006/080923 utilizes a tilted relationship between a reference and test mirror of a Fizeau interferometer to spatially separate the reflections. The separated beams are filtered to provide different polarization states and recombined to form a collinear beam. Alternatively, the beams may be injected at different angles into the Fizeau cavity. WO2006/080923 uses path length differences to suppress effects of spurious reflections.

In one embodiment, a delay line and a polarizing beam splitter are used in combination with a phase shifting interferometer to characterize a test surface in the Fizeau interferometer configuration. In this embodiment two mirrors are used in parallel to form a beam that is a combination of components of different delays. This combined beam is fed into an input of the interferometer.

SUMMARY OF THE INVENTION

Among others, it is an object to provide for accurate distance measurements that are less dependent on environmental disturbances on to the fiber.

An interferometric distance sensing device as claimed in claim 1 is provided. Herein a common path is used for the reference beam and the sensing beam, obtained by partial reflection and reception of partially transmitted light that has traveled back and forth over a distance to be sensed respectively. Herein the light that has traveled back is received from the direction of transmission of the partially transmitted light (or from the opposite of that direction, if one distinguishes travel back and forth along said direction as different directions). After return from the common path, light from the common path is fed to distinct input terminals of an N way coupler by parallel optical branch paths (here N is an integer that is at least three). Both the sensing beam and the reference beam travel through each of the parallel optical branch paths. The parallel optical branch paths have different lengths. A representation of the distance is computed from intensities detected at the outputs of the N way coupler.

The use of a three way coupler for sensing length differences between functionally parallel optical branch paths to the three way coupler is known per se from US2005275846. However, it has been realized that this technique can also be used to sense the length differences in a part of the optical path that precedes both parallel optical branch paths.

In an embodiment the optical path length provided by the first optical branch path exceeds that of the optical branch path by at least the coherence length of the light source. This ensures that the three way coupler does not measure the difference between the path lengths of the parallel optical branch path independent of the length of a path part of the sensing beam that precedes both parallel optical branch paths.

In an embodiment a pulsed light source is used, with a pulse width less than a difference in travel time through the optical branch path. In this case time intervals can be determined in which the detector signals are a result of, first of all, light of a light pulse that has traveled through the first optical branch path after reflection by the partially reflecting element and, secondly, return light from that light pulse that has traveled through the second optical branch path after reception from the direction of the transmission. By determining an indication of the distance from the detector signals in such a time interval the length of a path part of the sensing beam that precedes both parallel optical branch paths can be sensed.

BRIEF DESCRIPTION OF THE DRAWINGS

These and other objects and advantageous aspects will become apparent from a description of exemplary embodiment, using the following figures.

DETAILED DESCRIPTION OF THE DRAWINGS

Figure 1:
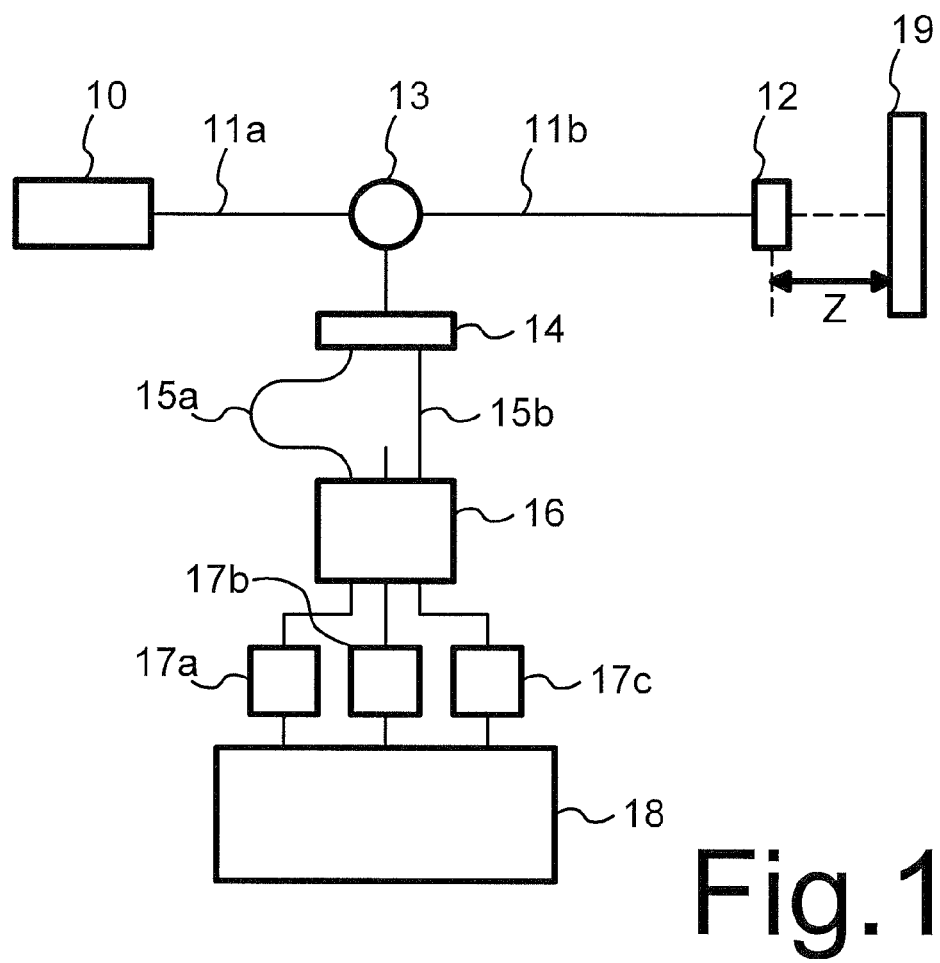
FIGS. 1 and 2 show interferometric distance sensing devices

FIG. 1 shows an interferometric distance sensing device, comprising a light source 10, a first optical fiber connection 11a,b, a partially reflecting element 12, a beam redirection device 13, a splitter 14, first and second branch fibers 15a,b that form optical branch paths, a three way coupler 16, detectors 17a-c and a signal processing circuit 18. Light source 10 may be a laser for example. Light source 10 may comprise a coherence control device and/or other light processing elements to process light before it is supplied from light source 10. Beam redirection device 13 may comprise a circulator. Other embodiments may comprise a fiber coupler with at least two ports at one side and at least one port at the other side (2×1, 2×2, N×M, etc.) or a partial reflector at a tilt angle to the beam. By way of example, embodiments wherein beam redirection device 13 includes a circulator will be described, but it should be understood that the circulator is used as an example of any beam redirection device 13.

First optical fiber connection 11a,b is coupled between light source 10 and partially reflecting element 12. Partially reflecting element 12 reflects and transmits respective fractions of the light, each having a respective part of the amplitude of the incoming light. The transmitted light is fed to a target 19, which is not part of the interferometric distance sensing device. Preferably the interferometric distance sensing device comprises a lens (not shown) between first optical fiber connection 11a,b and target 19, e.g. between partially reflecting element 12 and target 19.

As shown, first optical fiber connection 11a,b comprises part fibers 11a,b. Circulator 13 is located between a first part fiber 11a and a second part fiber 11b of first fiber connection 11a,b. Beam redirection device 13 may comprise an optical circulator. Although partially reflecting element 12 as a distinct element coupled to first optical fiber connection 11a, b, it should be understood that partially reflecting element 12 may in fact be integrated in first optical fiber connection 11a,b, for example as a Fiber Bragg Grating (FBG). Splitter 14 is coupled between an output of circulator 13 and first and second branch fibers 15a,b. The length of first branch fiber 15a differs from that of second branch fibers 15a,b. First and second branch fibers 15a run in parallel from respective outputs of splitter 14 to respective inputs of three way coupler 16. Detectors 17a-c are optical to electric signal converters with inputs coupled to respective outputs of three way coupler 16. Outputs of detectors 17a-c are coupled to signal processing circuit 18.

In operation, light from light source 10 is transmitted to partially reflecting element 12 via first optical fiber connection 11a,b and circulator 13. Partially reflecting element 12 reflects part of the light back to circulator 13 and passes another part to target 19. The part of the light that is passed is reflected from a target 19, which need not be part of the device, and passed back into part fiber 11b via partially reflecting element 12 and from there to circulator 13. A lens (not shown) may be used to focus the light from target 19 onto second part fiber 11b. Splitter 14 receives from circulator 13 both the part of the light that has been directly reflected by partially reflecting element 12 and the part that has been reflected by target 19. Splitter distributes this combination of light from circulator 13 over first and second branch fibers 15a,b, so that both branch fibers 15a,b receive a combination of light the part of the light that has been directly reflected by partially reflecting element 12 and the part that has been reflected by target 19. Three way coupler 16 supplies combinations of light from branch fibers 15a,b to each of its outputs, each output producing a combination with different relative phase delays between the components from the different branch fibers 15a,b. Detectors 17a-c detect the intensities of the incoming light. Signal processing circuit 18 uses the detected signals to compute distance measurements.

A three way coupler is described for example in US2005275846. A three way coupler is a device that supplies combinations of light from terminals on a first side of the coupler that acts as input side to each of terminals on a second side of the coupler that acts as output side, so that each terminal on the output side produces a combination with different relative phase delays between the components from different ones of the terminals at the input side. The term "side" is used here to distinguish groups of terminals the acts as input and outputs for each other (e.g. the terminals at the first side and inputs and the terminals on the second side as outputs). Because the three way coupler is a reciprocal device, the second side may be used as input side with the first side as output side. The three way coupler may be realized for example by means of three parallel optical waveguide (or fiber) segments that are exposed to each other in a way that allows part of the intensity of the guided light to be distributed between the waveguide segments. The parts of the waveguides on opposite sides of the coupled waveguide segments form the inputs and outputs of such a three way coupler. Other implementations are possible.

US2005275846 discloses measurement of the difference between the lengths of different optical paths to different inputs of the three way beam coupler. The device of US2005275846 feeds light from a light source through the different optical paths. The light from the paths is then coupled into two different inputs of the three way coupler, which produces combinations of the light from the input in different relative phase combinations. As a result the light at the outputs may exhibit interference between light from the inputs, in particular between the light from the different optical paths.

As described in US2005275846, the supply of light to inputs of such a three way coupler via two optical paths of different length results in detectable intensities I that depend on the path length difference D as follows: I=A (1+V*cos (phi+360*D/Lambda), wherein Lambda is the optical wavelength, A is a basic intensity value that is proportional to the intensity of the light from the light source and V is a parameter which represents the visibility of the cosine term. The value of the angle phi is different for the different outputs of the three way coupler. A condition for validity of this expression in the device of US2005275846 is that the distance D is in the same order or smaller than the coherence length of the light source, or at least as small that there is some interference between the light from the different paths (coherence length may equivalently be defined in terms of spectral bandwidth, as a factor times a ratio of wavelength squared and bandwidth wavelength range, e.g. with a factor 2 log (2)/(pi*n), wherein log is the natural logarithm and n is the index of refraction of the fibers). Otherwise, the intensity will be independent of the distance D, or if one wants, it could be said that the expression is valid with V=0. When there is at least some interference and measurements of the intensities at the three outputs are available, it is possible to compute the value of D. An advantage of this technique is that it can be used to determine the phase in the cosine function and hence from measurements at a single time point and that the result is independent of the parameters I and V which can be affected by example the attenuation in the two optical paths. By tracking the phase in the cosine function, the change in the distance D can be measured.

Applying the configuration of US2005275846 to the configuration of FIG. 1, the resulting device could be a device that measures the difference La−Lb between the optical path lengths La, Lb of the branch fibers 15a,b, if this difference were smaller than the coherence length of light source 10. For such a measurement, light source would only need to be connected to splitter 14, circulator 13 and partially reflecting element 12 would be redundant overhead and of course target 19 would be a source of needless variation.

In the device of FIG. 1 three way coupler 16, detectors 17a-c and signal processing circuit are used to sense the distance between partially reflecting element 12 and target 19. In an embodiment, the optical path length difference La−Lb between branch fibers 15a,b is larger than the coherence length of light source 10. Instead the difference |2*Z−|La−Lb|| between twice the distance Z from partially reflecting element 12 to target 19 and the optical path length difference between branch fibers 15a,b is preferably less than the coherence length. In contrast, both 2*Z and La−Lb are preferably significantly larger than the coherence length, for example more than 2 times the coherence length.

This makes it possible to measure the distance Z from partially reflecting element 12 to target 19, even though this distance is not a difference between the optical path lengths of branch fibers 15a,b, as would be required according to US2005275846. The reason for this is that the interference part of the intensities at detectors 17a-c is only due to a combination of, in the first place, light that has been reflected by partially reflecting element 12 and has traveled through the longest of branch fibers 15a,b, and in the second place light that has been reflected by target 19 and has traveled through the shortest of branch fibers 15a,b. Due to the coherence length, only this combination contributes to the distance dependent part of the intensities at detectors 17a-c, which varies periodically with the distance Z with different phase for different detectors 17a-c. The other part of the intensities depends, for each detector in the same way, on the intensities of the different light components. When three way coupler 16 provides for equal amplitude distribution with hundred and twenty degree phase shifts, the intensities Ia, Ib, Ic at detectors 17a-c can be expressed as $$Ia=A+B*\cos(phi\_a+360*(2*Z-(La-Lb))/\text{Lambda})$$

$$Ib=A+B*\cos(phi\_b+360*(2*Z-(La-Lb))/\text{Lambda})$$

$$Ic=A+B*\cos(phi\_c+360*(2*Z-(La-Lb))/\text{Lambda})$$

Herein the phase shifts phi_a, phi_b, phi_c, when expressed in degrees, are minus a hundred and twenty degrees, zero and plus a hundred and twenty degrees. Herein "cos" is the cosine function with arguments in degrees (of course any other type of argument such as an argument in radians may be used, in which the factor 360 is changed correspondingly). Lambda is the center wavelength of the light from light source 10. A and B are coefficients that depend on the amplitudes of the light components. B may also depend on the polarization state of the light in the inputs.

Signal processing circuit 18 is configured to determine the distance Z from the intensities Ia, Ib, Ic at detectors 17a-c. It follows from the expressions for these intensities that $$(2*Z-(La-Lb))=\text{lambda}*\text{arctg}(F*(Ia-Ic)/(2*Ib-Ia-Ic))/360$$

Herein arctg is the inverse tangent function, expressed in degrees. For a balanced three way coupler 16 the factor F equals the square root of three. The values of the coefficients A and B do not affect this determination, nor does variation of these values affect the determination. Given the difference La−Lb between the path lengths of branch fibers 15a,b the distance Z can be determined from this up to an offset of an integer number of half-wavelengths. Signal processing circuit 18 may be configured to use such mathematical formulas, or to solve the distance from equations that depend on the detected intensities, or to use a look-up table with values representing distances Z corresponding to different combinations of detected intensity (Ia, Ib, Ic). Signal processing circuit 18 may comprise a programmable computer system, with a program configured to execute the determination of the distance Z or 2*Z−(La−Lb) according to such formulas. If changes in distance need to be measured that are greater than an integer number of half-wavelengths, changes in the integer number of half-wavelengths may be determined by tracking the signal in time and stitching the phase calculation in the arctg function (unwrapping) as shown in the abovementioned equation or counting the number of periods as for conventional interferometers. By combining this with the determination from the formula, a change in distance Z of more than the wavelength can be measured to sub-wavelength accuracy.

The preceding expressions for the intensities and the determination of the distance apply for an embodiment with a balanced three way coupler, wherein light from the different inputs is distributed with equal intensities to all outputs with equal phase steps. In other embodiments, the coefficients A, B may be different for different devices, with intensity independent ratios between the coefficients for different outputs, and for different devices the phase shifts phi_a, phi_b, phi_c may deviate. However, the coefficient ratios and the phase shifts phi_a, phi_b, phi_c are independent of the distance Z. Typically, for a given device, they do not vary in time. Given the coefficient ratios and the phase shifts phi_a, phi_b, phi_c, signal processing circuit 18 can still determine Z. In an embodiment a calibration step may be used to determine parameters of the relation between distance and the three amplitude measurements. In an embodiment wherein three way coupler 16 is symmetric for a simultaneous interchange of the input from branch fibers 15a,b and interchange of the outputs to detectors 17a,c, the same expression for (2*Z−(La−Lb)) applies, but with a factor F dependent on the properties of three way coupler 16.

Although an embodiment has been described wherein both 2*Z and the difference between the lengths of branch fibers 15a,b exceeds the coherence length of light source which ensures that interference occurs only between light between the desired light paths, this is not indispensable. Instead, in an embodiment using time separation, light source 10 may be pulsed, and determination of the distance may be performed using detected intensities from a temporal part of the detected signals that corresponds to a combination of, in the first place, light that has been reflected by partially reflecting element 12 and has traveled through the longest of branch fibers 15a,b, and in the second place light that has been reflected by target 19 and has traveled through the shortest of branch fibers 15a,b.

Four light components of the detected light may be distinguished. A first light component corresponds to light that has been reflected by partially reflecting element 12 and has traveled through the shortest of branch fibers 15b. A second light component corresponds to light that has been reflected by partially reflecting element 12 and has traveled through the longest of branch fibers 15a. The time delays between the transmission of the pulse by light source 10 and the arrival at detectors 17a-c does not depend on distance Z and is therefore accurately known. A third light component corresponds to light that has been reflected by target 19 and has traveled through the shortest of branch fibers 15b. A fourth light component corresponds to light that has been reflected by target 19 and has traveled through the longest of branch fibers 15a. As a function of time the detection signal following a pulse initially comprises a part due to the first light component and finally a part due the fourth light component. In between the detection signal is due to the second and third light components.

When the difference |2*Z−|La−Lb|| is less than light travelling distance corresponding to the pulse width of the light source, this includes a part where the detection signal is the result of a combination of the second and third light component, from which the distance can be determined as describe for the embodiment wherein the difference La−Lb is larger than the free space light travelling distance corresponding to the pulse width of the light source. Transitions between different combinations of components can be detected from intensity changes as a function of time, and partly from known time delays. These transitions have rise and fall times determined by the pulses, which are much faster and more abrupt than distance changes, which makes these transitions detectable. Once approximate measurements of the distance Z are available the time points of the transitions can be predicted.

In the embodiment using time separation with the pulsed light source 10, signal processing circuit 18 is configured to determine when a sensing time interval occurs wherein detectors 17a-c detect a combination of the second and third light components, but not the combination of the first and third light components. Signal processing circuit 18 is configured to use detected intensities in that sensing time interval to compute the distance. In an exemplary embodiment synchronization with the pulses may be used, for example by supplying a signal from signal processing circuit 18 to light source 10 to trigger a pulse or vice versa. Signal processing circuit 18 may be configured to determine the sensing time interval from the time point of the pulse and predicted delay to the start and end of that time interval. In another embodiment, signal processing circuit 18 may be configured to determine the sensing interval from pulse related temporal intensity changes in the detected signal.

In an embodiment the longest of branch fibers 15a,b is replaced by a plurality of branch fibers, coupled in parallel between a splitter and a combiner. Thus, each of the plurality of branch fibers may be used to make the described second component present for interference with light from the target when the target is at different distances.

Although an embodiment has been described wherein optical fibers are used between light source 10 and partially reflecting element 12, and between splitter 14 and three way coupler 16, it should be understood that other types of light path may be used. A path or path parts through a glass body, or through the air may be used for example. Furthermore, although FIG. 1 shows that the beam is outside the fiber between partially reflecting element 12 and target 19, it should be appreciated that instead target 19 may be in the fiber, or a part of the path between partially reflecting element 12 and target 19 may be in the fiber. When a fiber is used between partially reflecting element 12 and target 19, the device can be used to measure length changes of that fiber.

In combination with the embodiment using time separation, the length of fiber connection 11a,b and hence the location of the reflection element 12 does not need to be fixed.

Although separate embodiments have been described for coherence separation and time separation, they can be combined to enable measurement along a fiber by using light scattering for example Rayleigh in the fiber as reflection element 12 and target 19. In this case, distributed reflection from the fiber is used, so that no discrete reflecting element 12 is needed. Instead the fiber acts as a reflection element 12. But when the fiber acts as a distributed reflection element, it does not define a single unique optical path length for the light that is reflected without passing to target 19. In this case a combination of pulses and a larger optical path length difference than the coherence length may be used.

Signal processing circuit 18 may configured to associated respective measurement time points relative to the time of transmission of the pulse with respective different positions in the fiber that contribute to the interference at that time point, as follows from the time needed for light to travel from the light source to each position and back from that position to the detectors 17a-c. From the measurements at the detectors 17a-c at a time point or time points at which the reflected light from a positions in the fiber arrive at detectors 17a-c signal processing circuit 18 may determine the distance between that position and target 19. Thus signal processing circuit 18 may determine distance values for respective positions of reflection in the fiber. Signal processing circuit 18 may be configured to combine these distance values, e.g. by averaging, to obtain a sensing result.

A similar technique may be applied when target 19 produces distributed reflection. In this case relative reflection intensities as a function of distance may be determined.

Figure 2:
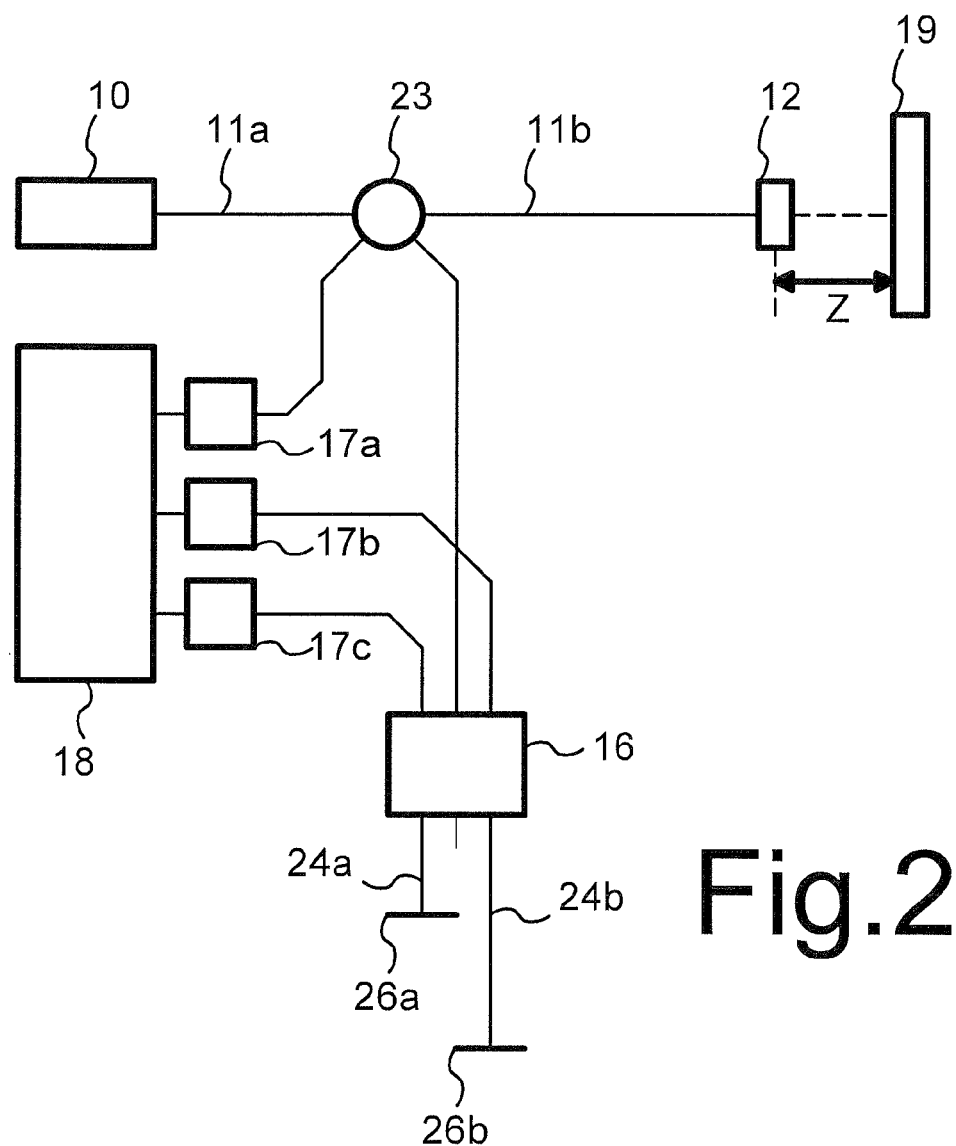

FIG. 2 shows an alternative layout of the interferometric distance sensing device. Herein four terminal beam redirection device 23 is used, with terminals coupled to light source 10, fiber part 11b to and from partially reflecting element 12, and a first terminal on a first side of three way coupler 16 and a first detector 17a. Beam redirection device 23 may be a 4-port circulator (or other redirection device, such as a pair of circulators or a 2×2 coupler), configured to direct light from light source 10 to fiber part 11b, light from fiber part 11b to three way coupler 16, and light from three way coupler 16 to first detector 17a. Second and third terminals at the first side of three way coupler 16 are coupled to second and third detectors 17b,c. All couplings may be realized by a respective optical fiber.

The device comprises first and second reflector 26a,b and a second and third fiber 24a,b that serve as optical branch paths. Second and third fiber 24a,b have mutually different length. Second and third fiber 24a,b are coupled between first and second terminals at a second side of three way coupler 16 and first and second reflector 26a,b respectively. First and second reflector 26a,b may be integrated in second and third fiber 24a,b respectively, or they may be discrete reflectors.

In operation the combination of light that has been reflected by reflecting element 12 and light that has been passed by reflecting element and reflected by target 19 is directed to three way coupler 16. Three way coupler 16 distributes this combination over second and third fiber 24a,b, each of second and third fiber 24a,b receiving a combination of light that has been reflected by reflecting element 12 and light that has been passed by reflecting element and reflected by target 19. First and second reflector 26a,b reflect this light and second and third fiber 24a,b feed it back to three way coupler 16. Three way coupler 16 combines and distributes the reflected light in different phase combinations to first, second and third detectors 17a-c.

In an embodiment, twice the optical path length difference La−Lb between second and third fiber 24a,b is larger than the coherence length of light source 10. Instead the difference |Z−|La−Lb|| between the distance Z from partially reflecting element 12 to target 19 and the optical path length difference between second and third fiber 24a,b is preferably less than the coherence length. In contrast, both 2*Z and 2*(La−Lb) are preferably significantly larger than the coherence length, for example more than 2 times the coherence length.

As a result, the interference part of the intensities at detectors 17a-c is only due to a combination of, in the first place, light that has been reflected by partially reflecting element 12 and has traveled through the longest of second and third fiber 24a,b, and in the second place light that has been reflected by target 19 and has traveled through the shortest of second and third fiber 24a,b. Due to the coherence length, only this combination contributes to the distance dependent part of the intensities at detectors 17a-c, which varies periodically with the distance Z with different phase for different detectors 17a-c. The other part of the intensities depends, for each detector in the same way, on the intensities of the different light components.

This results in expressions for the light intensities at detectors 17a-c in the same form as those for the embodiment of FIG. 1, except that double the path length difference between second and third fiber 24a,b appears in the expressions instead of the path length difference between branch fibers 15a,b. Accordingly, signal processing circuit 18 may be configured to compute the distance variation in the same way as in the embodiment of FIG. 2.

Although an embodiment has been described wherein the reflected light is returned from partially reflecting element 12 through the same path through which light is supplied from light source 10 to partially reflecting element 12, it should be appreciated that instead separate paths may be used. For example, partially reflecting element 12 may be configured to provide partial reflection from a first fiber to a second fiber and partially reflecting element 12 may be followed by an optical element that redirects the transmitted light to a direction from which reflected light will be captured into the second fiber. In this case the second fiber may be coupled directly to splitter 14.

Although an embodiment has been described wherein the branch fibers 15a,b are each coupled to a single input of three way coupler 16, it should be appreciated that more complex connections may be used, for example splitters and combiner may be used to couple a combination of light from branch fibers 15a,b to one input and light from individual ones of branch fibers 15a,b to respective other inputs. An N way coupler (N>3) may be used wherein branch fibers 15a,b are coupled in mutually different ways to the inputs and detectors are coupled in mutually different ways to the outputs. Such configurations will be referred to as input of three way couplers 16 as well.

The device may comprise a beam splitter arrangement between partially reflecting element 12 and target 19, configured to transmit light to a plurality of targets and return reflected light from this plurality of targets. In this embodiment, a pulsed light source 10 may be used, and signal processing circuit 18 may be configured to distinguish time intervals wherein detectors 17a-c receive combinations of the described second and third components from respective ones of the targets.

In an embodiment the longest of branch fibers 15a,b or of second and third fiber 24a,b may be replaced by a plurality of branch fibers, coupled in parallel between a splitter and a combiner. Thus, each of the plurality of branch fibers may be used to make the described second component present for interference with light from a respective one of the targets.

In an embodiment Rayleigh scattering in the first fiber is used to realize both partially reflecting element 12 and targe 17. Thus, distributed reflection is provided.

Although an exemplary embodiment using a three way coupler has been described, it should be appreciated that instead an N-way coupler (N>3) may be used, with branch fibers 15a,b coupled to a first and second one of the inputs and with N detectors coupled to N outputs of the N way coupler, or N−1 detectors coupled to the first side of an N way coupler instead of three way coupler 16 in the embodiment of FIG. 2. Such an N way coupler may be realized for example by means of a bundle of N optical fibers, mutually exposed to allow exchange of light. Such an N-way coupler gives rise to separately detectable output intensities that can be expressed in the same way as for the three way coupler, enabling determination of the distance Z. An N-way coupler (N>3) provides redundant information which may be used by a signal processing circuit to reduce errors and/or eliminate dependence on device properties other than the distance Z. When N>3 each branch fiber 15a,b may be coupled to more than one of the inputs of the N-way coupler and/or M detectors (M at least 3 and less than or equal to N, and preferably M>3) may be coupled to only part of the outputs of the N-way coupler, so that it is effectively used as a less than N way coupler.

It should be appreciated that the design of the described distance sensing devices makes it possible to realize the most critical part of the device in an integrated optical circuit, comprising the at least the three-way coupler and the branch fibers, and optionally splitter 14.

The invention claimed is:

1. An interferometric distance sensing device, comprising a light source;
a partially reflecting element that:
  reflects a first fraction of light from the light source;
  transmits a second fraction of the light from the light source;
  receives light from reflection of the transmitted second fraction by a target; and
  returns the received light as returned light together with the reflected first fraction, a return;
a first and second optical branch path that transmit respective parts of an intensity of a combination of the returned light and the reflected first fraction from the partially reflecting element simultaneously;
an N-way coupler, wherein N is at least three, comprising a first side with terminals coupled to the first and second optical branch path respectively, the first optical branch path providing a larger optical path length than the second optical branch path;
at least three light intensity detectors optically coupled to respective terminals at a second side of the N-way coupler that detect the light intensity of detection signals; and
a signal processing circuit including inputs coupled to the light intensity detectors, the signal processing circuit processing information to determine an excess distance traveled by the second fraction from the partially reflecting element and back from the detection signals as detected from the at least three light intensity detectors.

2. A device according to claim 1, wherein the light source defines a coherence length of light from the light source, the optical path length traveled by a respective part of the combination of the returned light and the reflected first fraction through the first optical branch path exceeding the optical path length traveled by the respective part of the combination, through the second optical branch path by at least the coherence length.

3. A device according to claim 1, wherein the light source is configured to output a light pulse, of a width less than a difference in travel time through the first and second optical branch path, the signal processing circuit being configured to determine time intervals in the signals from the detectors wherein the signals are a result of, first of all, light of the light pulse that has traveled through the first optical branch path after reflection by the partially reflecting element and, secondly, return light from that light pulse that has traveled through the second optical branch path after reception from the direction of the transmission, the signal processing circuit being configured to compute information indicative of said distance from detection signals from the at least three light intensity detectors in that interval.

4. A device according to claim 1, comprising an optical fiber optically coupled to the partially reflecting element or comprising the partially reflecting element, wherein the partially reflecting element receives light from the light source via the optical fiber and returns the light received from the direction of the transmission together with the reflected first fraction through the optical fiber.

5. A device according to claim 1, wherein the first and second optical branch path are optical fibers of different lengths.

6. A device according to claim 1, comprising a splitter configured to split the combination of the light received from the direction of the transmission and the reflected first fraction into first and second parts, each containing a respective further combination of part of the light received from the direction of the transmission and part of the reflected first fraction, inputs of the first and second optical branch path being coupled to the splitter to receive the respective further combinations respectively, outputs of the first and second optical branch path being coupled to the terminals at the second side of the N way coupler.

7. A device according to claim 1, wherein a further terminal on the second side of the N-way coupler is configured to receive the combination of the light received from the direction of the transmission and the reflected first fraction, the device comprising first and second further reflective elements coupled to, or part of, the first and second optical branch path, for reflecting light transmitted through the first and second optical branch path from the N-way coupler back to the N-way coupler, the optical path length provided by the first and second optical branch path being twice the optical length of the optical branch paths between the N-way coupler and the further reflective elements.

8. A method of interferometrically sensing distance to a target comprising:
  collecting a first fraction of light from a light source after reflection by a partially reflective element, together with returned light that results from reflection from a target of a second fraction of light from the light source that has been transmitted by the partially reflective element;
  feeding a first and second combination, both of part of the first fraction and part of the returned light, through a first and second optical branch path simultaneously to respective terminals of an input side of an N-way optical coupler respectively, N being at least three, the first optical branch path providing for a larger optical path length than the second optical branch path;
  feeding light from at least three terminals on an output side of the N-way optical coupler to respective light intensity detectors; and
  determining, using a signal processing circuit, information representing an excess distance that is traveled by the second fraction from the partially reflecting element and back from the target to the partially reflecting element, from detection signals detected from the at least three light intensity detectors.

9. A method according to claim 8, wherein an optical path length traveled by a first combination of the returned light and the reflected first fraction, through the first optical branch path exceeds the optical path length traveled by a second combination through the second optical branch path, by at least the coherence length of the light from the light source.

10. A method according to claim 8, further comprising supplying a light pulse to the partially reflecting element, the pulse having a width less than a difference in travel time through the first and second optical branch path, determining time intervals in the signals from the detectors wherein the signals are a result of, first of all, light of the light pulse that has traveled through the first optical branch path after reflection by the partially reflecting element and, secondly, the returned light from the light pulse that has traveled through the second optical branch path after reception from the direction of the transmission, the signal processing circuit further computing information indicative of said distance from detection signals from the at least three light intensity detectors in that interval.

11. A method according to claim 8, further comprising supplying the light from the light source through an optical fiber, wherein the optical fiber is optically coupled to the partially reflecting element, or the optical fiber comprises the partially reflecting element.

12. A method according to claim 8, wherein the first and second optical branch path comprise optical fibers of different lengths.

13. A method according to claim 8, further comprising supplying a light pulse to the partially reflecting element, the signal processing circuit being configured to compute information indicative of said distance from detection signals from the at least three light intensity detectors at a time point or time points of arrival of the first fraction of light from a light source, the time point or points corresponding to arrival of the pulse at the detectors after reflection from a same position in a partially reflective element.

* * * * *